(12) United States Patent
Hu et al.

(10) Patent No.: US 6,809,912 B2
(45) Date of Patent: Oct. 26, 2004

(54) INDUCTOR OPERABLE UNDER VARIOUS SUPPLY VOLTAGES

(75) Inventors: Heng-Yi Hu, Taoyuan Shien (TW); Cheng-Pin Wang, Taoyuan Shien (TW)

(73) Assignee: Delta Electronics, Inc., Taoyuan Shien (TW)

( * ) Notice: Subject to any disclaimer, the term of this patent is extended or adjusted under 35 U.S.C. 154(b) by 565 days.

(21) Appl. No.: 09/820,990

(22) Filed: Mar. 30, 2001

(65) Prior Publication Data

US 2002/0063617 A1 May 30, 2002

(30) Foreign Application Priority Data

Nov. 27, 2000 (TW) ........................................ 89220560 U

(51) Int. Cl.[7] .............................................. H02H 9/00
(52) U.S. Cl. .......................... 361/58; 361/111; 361/118
(58) Field of Search .............................. 361/58, 56, 111, 361/113, 118, 38, 119, 92

(56) References Cited

U.S. PATENT DOCUMENTS 4,350,934 A * 9/1982 Spreadbury .................. 315/282

* cited by examiner

Primary Examiner—Stephen W. Jackson
(74) Attorney, Agent, or Firm—Birch, Stewart, Kolasch & Birch, LLP

(57) ABSTRACT

An inductor operable under various supply voltages includes a first coil, a second coil, a bobbin and a core, wherein the coil diameter of the first coil is larger than the coil diameter of the second coil and the first and the second coils are connected in series, whereby input electric current flows through one coil selected from said first and second coils by utilizing a selecting switch, so as to generate sufficient corresponding inductance according to various input supply voltages.

9 Claims, 5 Drawing Sheets

INDUCTOR OPERABLE UNDER VARIOUS SUPPLY VOLTAGES

BACKGROUND OF THE INVENTION

A. Field of the Invention

The present invention relates to an inductor, and particularly to a general-purpose inductor operable under various supply voltages.

B. Description of the Related Art

Inductors have been broadly applied to various types of circuits, such as power factor correction circuit, to solve the problem of harmonic in supply voltages.

Regarding the application of working voltage in a circuit, conventional inductors can be roughly classified into two categories, namely general-purpose inductors for variable voltages and special purpose inductors for a predetermined voltage.

As shown in FIG. 1 and FIG. 2, a harmonic inductor includes: two E-like core members 31, two bobbins 32, and a magnetically permeable iron sheet 34. As to the harmonic inductor, though it is operable under various supply voltages, its structure is very complex. Furthermore, two coils are connected in series to form another single coil without any additional performance applicable to other devices. Additionally, since the two coils are connected in series to form a single coil when applied, it is necessary for the two coils to have the same size coil diameter to meet the regulations of harmonic current. That is, based on the consideration of the safety, the suitable size of the coil diameter for the coils have to be relatively larger. Thus, it is impossible to effectively minimize the overall volume of the inductor.

SUMMARY OF THE INVENTION

In view of the above, an objective of the invention is to provide an inductor with a simplified structure and a miniature volume that is operable under various supply voltages.

Another objective of the invention is to provide an inductor operable in association with all types of selecting switches and under various supply voltages.

The characteristics of the inductor operable under various supply voltages according to the invention are that two coils with different coil diameters are connected in series and provided on a bobbin so as to minimize the overall volume of the inductor.

Additionally, another characteristics of the inductor operable under various supply voltages according to the invention are to connect the connecting part of the same coils to all types of selecting switches so that the inductor can be operable under various supply voltages.

In order to complete the above objective, the inductor operable under various supply voltages according to the invention includes: a first coil used as a primary connecting coil for supply voltage, a second coil used as a secondary connecting coil for supply voltage, a bobbin for supporting and mounting the first and the second coils, and a core for interacting with the first and the second coils to produce inductance, wherein the coil diameter of the first coil is larger than the coil diameter of the second coil, and the first and the second coils are connected in series, whereby input electric current can flow through one coil selected from the first and second coils by utilizing a selecting switch, so as to generate sufficient corresponding inductance according to various input supply voltages. As a result, the inductor operable under various supply voltages according to the invention, indeed, is operable in association with all types of selecting switches.

BRIEF DESCRIPTION OF THE DRAWINGS

These and other objectives and advantages of the invention will become apparent by reference to the following description and accompanying drawings wherein.

DETAILED DESCRIPTION OF THE INVENTION

In the following, the preferred embodiments according to the invention will be described in detail by reference with the drawings.

Figure 1:
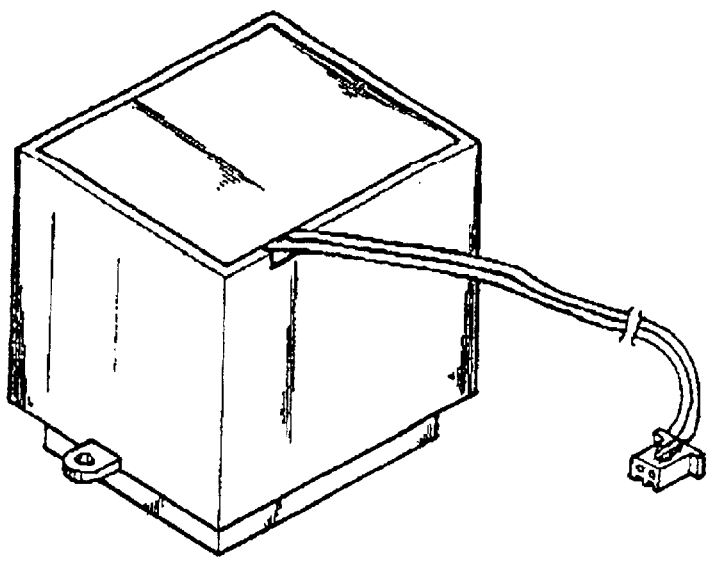
FIG. 1 is a perspective view of a conventional inductor.
Figure 2:
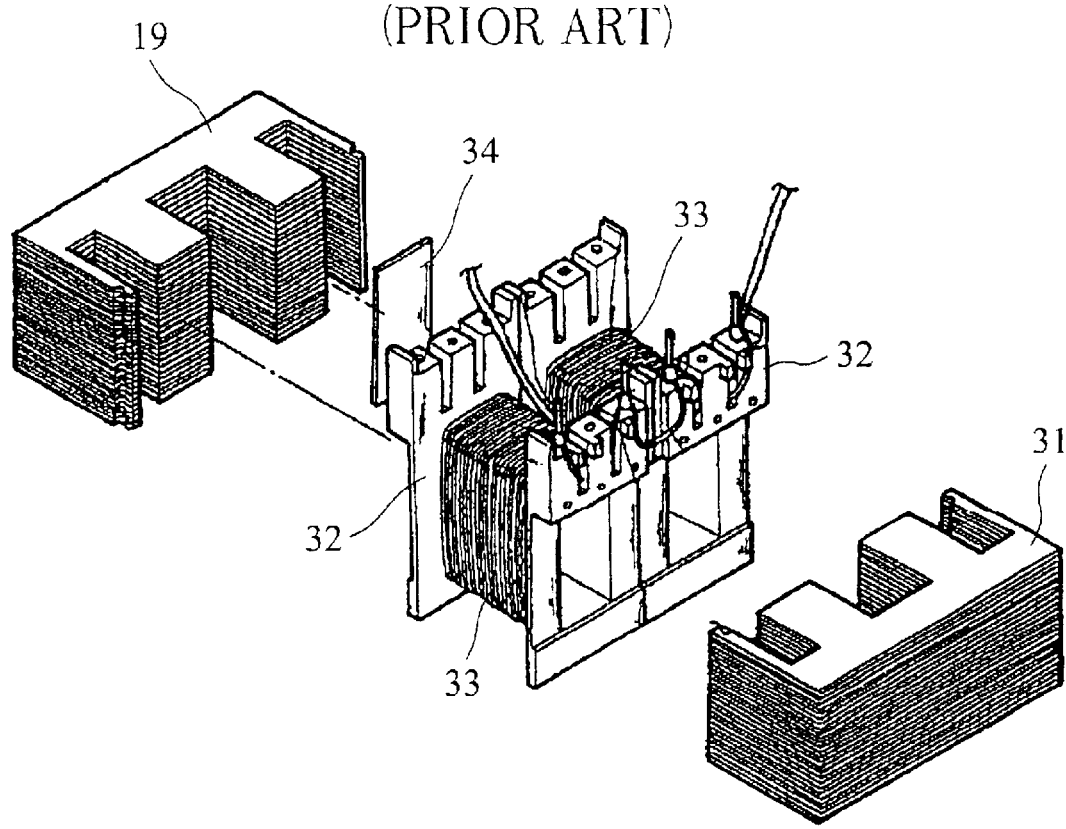
FIG. 2 is an exploded view of the conventional inductor shown in FIG. 1.
Figure 3:
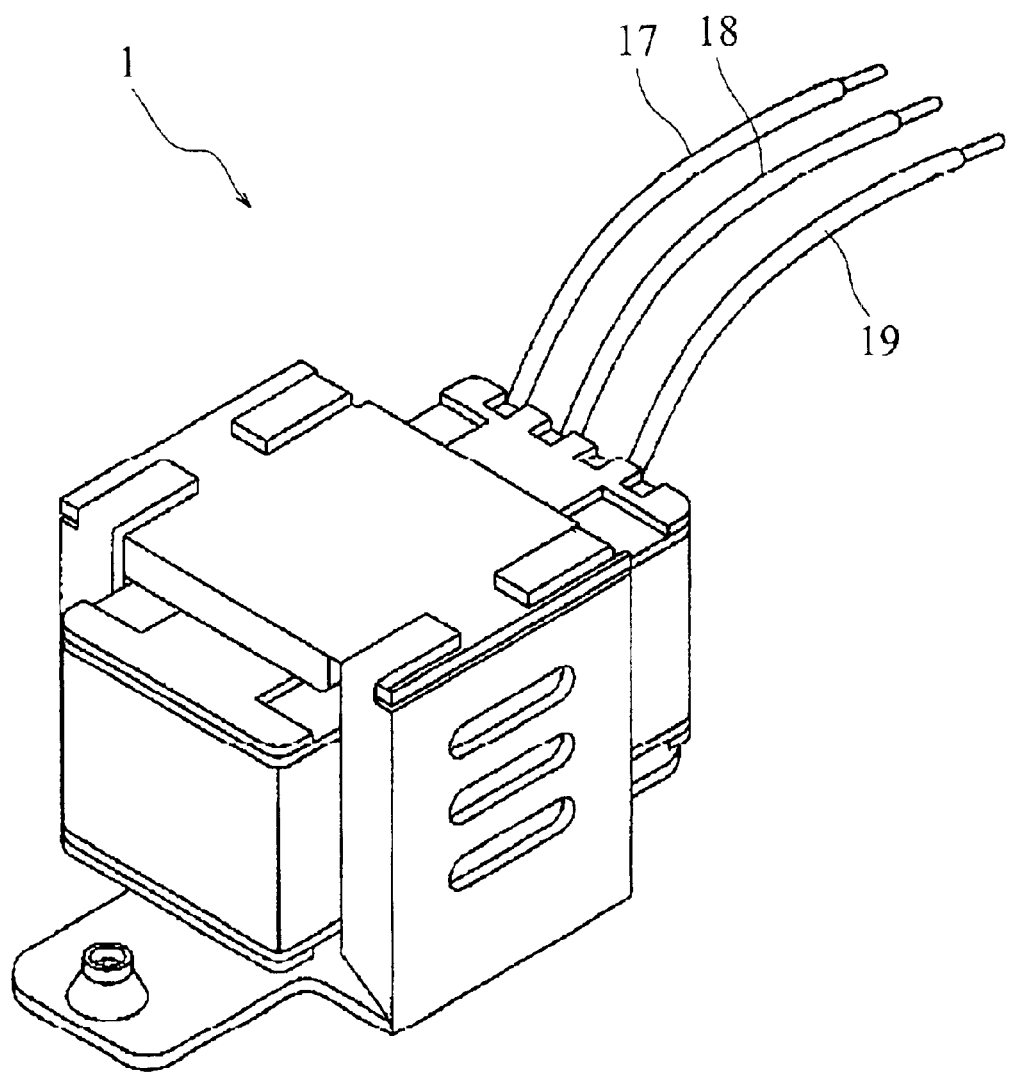
FIG. 3 is a perspective view of an inductor operable under various supply voltages as a preferred embodiment according to the invention.
Figure 4:
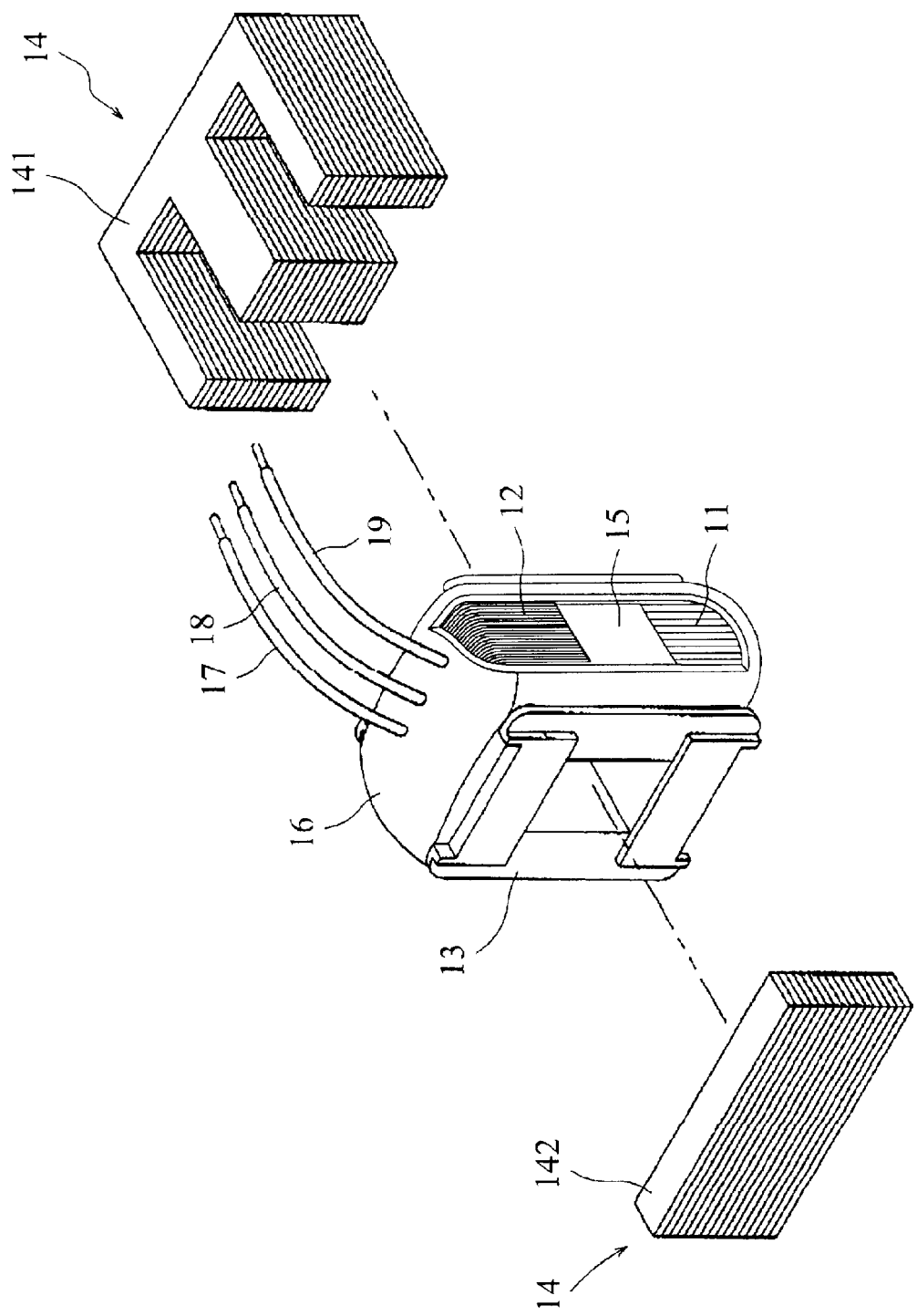
FIG. 4 is an exploded view of an inductor operable under various supply voltages as a preferred embodiment according to the invention.

Referring to FIG. 3 and FIG. 4, the inductor 1 operable under various supply voltages according to the invention includes a first coil 11, a second coil 12, a bobbin 13 and a core 14.

The first coil 11 is connected to a supply source (not shown) from outside by a terminal 17 and serves as a primary connecting coil for supply voltage.

The second coil 12 is connected to a supply source (not shown) from outside by a terminal 19 and serves as a secondary connecting coil for supply voltage.

The bobbin 13 is for supporting and mounting the first coil 11 and the second coil 12. As shown in FIG. 4, the first coil 11 is wound on the bobbin 13 and then is wrapped with insulation material 15. One end of the first coil 11 is connected to the terminal 17. The second coil 12 is wound on the insulation material 15 and then is wrapped with insulation material 16. One end of the second coil 12 is connected to the terminal 19.

The coil diameter of the first coil 11 is larger than that of the second coil 12 and the adjacent ends (not shown) each of the first coil 11 and the second coil 12 are connected in series so that the connecting ends each of the first coil 11 and the second coil 12 are connected to one end of a terminal 18, respectively. What is worthy of mention is that the winding sequences each of the first coil 11 and the second coil 12 are alternative. In other words, the second coil 12 can be wound on the bobbin 13 earlier than the first coil 11.

The core 14 is formed of silicon steel and consists of an E-like core member 141 and an I-like core member 142. A central protrusion 1411 of the E-like core member 141 passes through inside of the bobbin 13 to abut to the I-like core member 142, whereby the E-like core member 141 and the I-like core member 1411 are around the first coil 11 and the second coil 12 to allow the inductor 1 to produce inductance after the electrical current flows through the first coil 11 and the second coil 12.

The above-mentioned description is for illustrating the constitution of the inductor 1 operable under various supply voltages according to the invention. The following will describe the application of the inductor 1 operable under various supply voltages according to the invention to all types of selecting switches.

Figure 5:
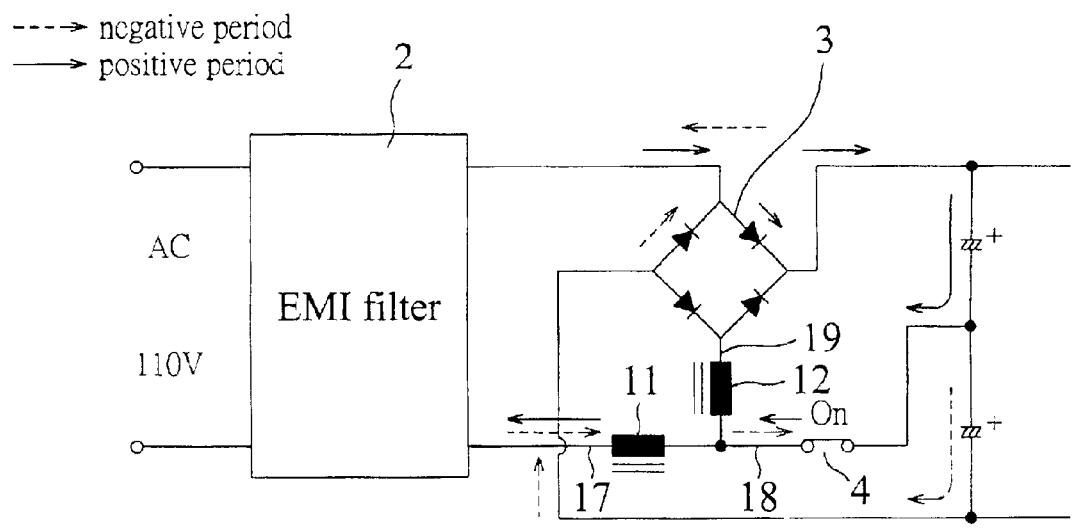
FIG. 5 is a schematic view showing the circuit diagram when an inductor operable under various supply voltages as a preferred embodiment according to the invention is used with a manual selecting switch.

Referring to FIG. 5, a part of a circuit for power supply is shown, wherein the first coil 11 of the inductor 1 operable under various supply voltages according to the invention is electrically connected to an EMI (electromagnetic interference) filter 2 through the terminal 17; the second coil 12 is electrically connected to a bridge rectifier 3 through a terminal 19; and the connecting ends each of the first coil 11 and the second coil 12 are connected to a manual selecting switch through the terminal 18. What is worthy of mention is that the foregoing manual selecting switch 4 is an original selecting switch (voltage selecting switch) for a general power supply. In other words, with the constitution of the inductor 1 operable under various supply voltages according to the invention, the inductor 1 is operable in association with all types of selecting switches so as to broaden the utilization scope thereof. For example, as shown in FIG. 5, when an input voltage for the circuit is 110V, the manual selecting switch 4 is set "ON" and, meanwhile, the electric current flows through the first coil 11 only. Furthermore, with reference to FIG. 6, when an input voltage for the circuit is 220V, the manual selecting switch 4 is set "OFF" and, meanwhile, the electrical current passes through the first coil 11 and the second coil 12 simultaneously. In brief, in case of a high voltage from outside of the inductor 1, the inductance caused by the second coil 12 can be added by setting the manual selecting switch 4 to reinforce the total inductance needed.

Figure 6:
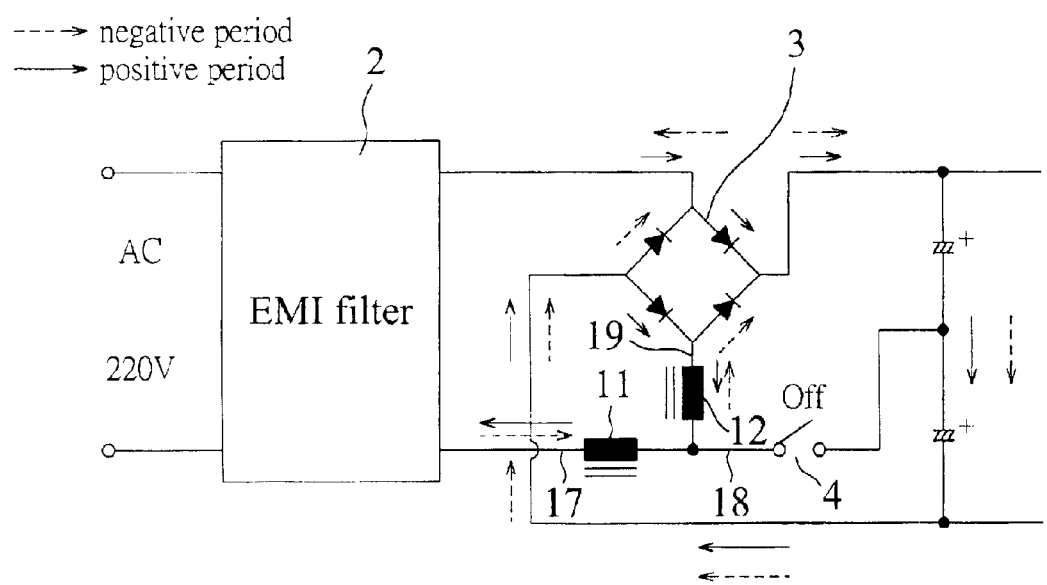
FIG. 6 is another schematic view showing the circuit diagram when an inductor operable under various supply voltages as a preferred embodiment according to the invention is used with a manual selecting switch.
Figure 7:
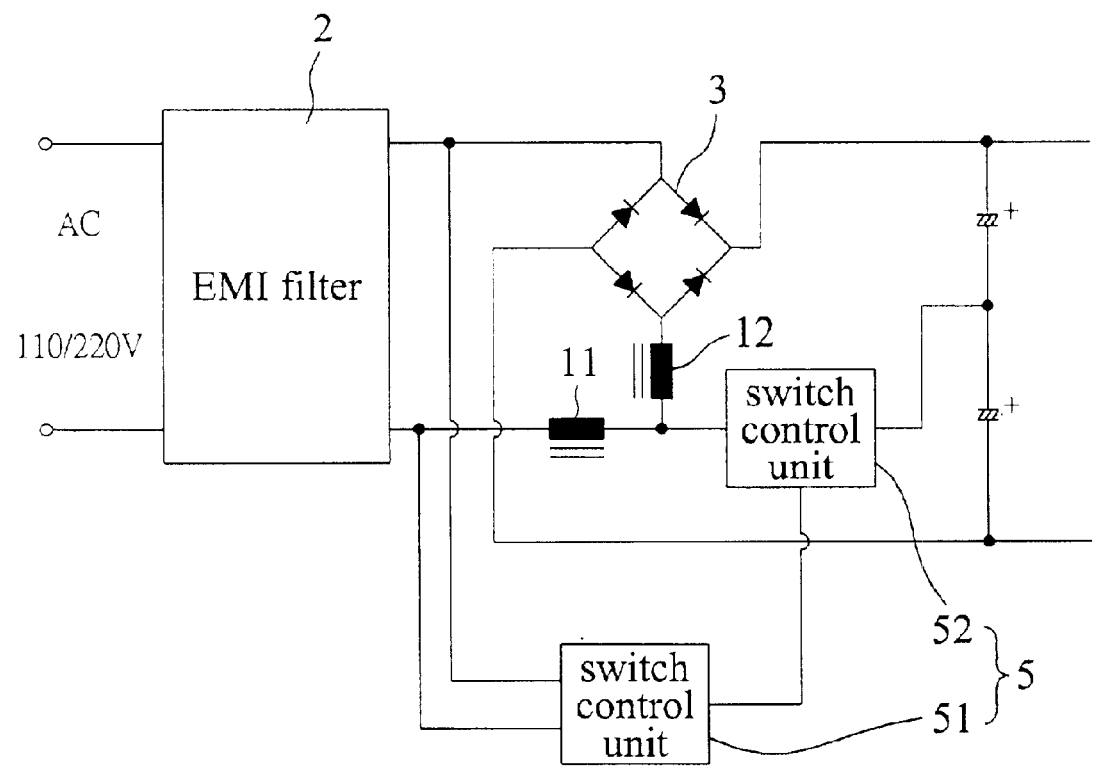
FIG. 7 is a schematic view showing the circuit diagram when an inductor operable under various supply voltages as a preferred embodiment according to the invention is used with an automatic selecting switch.

Referring to FIG. 7, the inductor 1 operable under various supply voltages according to the invention is applied to another circuit with a similar constitution to the circuit shown in FIG. 5 and FIG. 6 except that an automatic selecting switch 5 is used to replace the manual selecting switch 4. The automatic selecting switch 5 includes a voltage-detecting unit 51 and a switch control unit 52. The voltage-detecting unit 51 is used to detect the input voltage, while the switch control unit 52 is used to turn on/off the circuit based on the detected results obtained from the voltage-detecting unit 51. For example, when the voltage-detecting unit 51 detects a voltage of 110V, the switch control unit 52 is in turn-on state. On the other hand, when the voltage-detecting unit 51 detects a voltage of 220V, the switch control unit 52 is in turn-off state. As a result, with the inductor 1 operable under various supply voltages, electric current can flow through different coils by utilizing the selecting switches to produce sufficient corresponding inductance under different voltages.

In short, since the second coil 12 with a smaller coil diameter is utilized in the conductor 1 operable under various supply voltages according to the invention and the first coil 11 and the second coil 12 are mounted on the same bobbin 13, the volume of the inductor 1 operable under various supply voltages according to the invention can be reduced over a wide span. For instance, in the above-mentioned power supply, when the output power of the power supply is 110 W, the first coil 11 is formed of a wire having a diameter of 0.5 mm and wound with 170 cycles and the second coil 12 is formed of a wire having a diameter of 0.4 mm and wound with 190 cycles so as to provide an inductor having a volume of 28 mm×28 mm.

Additionally, the inductor 1 operable under various voltages is operable in association with a selecting switch so that the electric current can flow through the different coils by utilizing the selecting switches to produce sufficient corresponding inductance under different supply voltages. As a result, the inductor 1 operable under various supply voltages according to the invention, indeed, is operable under various supply voltages.

It should be understood that various alternatives to the structures described herein may be employed in practicing the present invention. It is intended that the following claims define the invention and that the structure within the scope of these claims and their equivalents be covered thereby.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. An inductor operable under various supply voltages comprising a core for interacting with conductive coils to produce inductance, a first coil serving as a primary coil for supplying voltage, a second coil serving as a secondary coil for supplying voltage, and a bobbin for supporting and mounting said first and said second coils, wherein said first and second coils being connected in series, and said first coil having a coil diameter larger than that of said second coil whereby input electric current flows through at least one coil selected from said first and second coils by utilizing a selecting switch, so as to generate sufficient corresponding inductance according to various input supply voltages.

2. The inductor operable under various supply voltages as claimed in claim 1, wherein said first coil and said second coil are connected at a connecting end to which said selecting switch is connected.

3. The inductor operable under various supply voltages as claimed in claim 1, wherein said selecting switch is a manual selecting switch.

4. The inductor operable under various supply voltages as claimed in claim 1, comprising a supply voltage detecting unit and a switch control unit, and wherein said voltage-detecting unit is used to detect an input supply voltage, while said switch control unit is used to turn on/off a circuit based on detected results obtained from the voltage-detecting unit.

5. The inductor operable under various supply voltages as claimed in claim 1, wherein said core is made of silicon steel.

6. The inductor operable under various supply voltages as claimed in claim 1, wherein said core comprises an E-like core member and an I-like core member.

7. The inductor operable under various supply voltages as claimed in claim 6, wherein said E-like core member has a central protrusion passing through said bobbin.

8. The inductor operable under various supply voltages as claimed in claim 6, wherein said first coil is wound on said bobbin and then said second coil is wound on said second coil.

9. The inductor operable under various supply voltages as claimed in claim 8, wherein insulation material is further provided between said first coil and said second coil.

* * * * *